(12) United States Patent
Kawaguchi et al.

(10) Patent No.: US 9,114,691 B2
(45) Date of Patent: Aug. 25, 2015

(54) PROTECTOR WITH SENSOR AND METHOD OF MOLDING END PART OF THE SAME

(71) Applicant: NISHIKAWA RUBBER CO., LTD., Hiroshima-shi, Hiroshima-ken (JP)

(72) Inventors: Toshimichi Kawaguchi, Hiroshima (JP); Takahiro Yamaki, Hiroshima (JP)

(73) Assignee: NISHIKAWA RUBBER CO., LTD., Hiroshima-Ken (JP)

(*) Notice: Subject to any disclaimer, the term of this patent is extended or adjusted under 35 U.S.C. 154(b) by 0 days.

(21) Appl. No.: 14/277,266

(22) Filed: May 14, 2014

(65) Prior Publication Data

US 2014/0339842 A1    Nov. 20, 2014

(30) Foreign Application Priority Data

May 20, 2013  (JP) .................................. 2013-106634

(51) Int. Cl.
| | |
|---|---|
| *E05F 15/02* | (2006.01) |
| *B60J 5/04* | (2006.01) |
| *B29C 45/16* | (2006.01) |
| *B60J 10/00* | (2006.01) |
| *B60J 10/08* | (2006.01) |
| *B60J 10/12* | (2006.01) |
| *E05F 15/44* | (2015.01) |

(52) U.S. Cl.
CPC .............. *B60J 5/0495* (2013.01); *B29C 45/16* (2013.01); *B60J 10/0022* (2013.01); *B60J 10/0031* (2013.01); *B60J 10/0057* (2013.01); *B60J 10/0065* (2013.01); *B60J 10/085* (2013.01); *B60J 10/12* (2013.01); *E05F 15/44* (2015.01); *E05Y 2400/654* (2013.01); *E05Y 2900/531* (2013.01)

(58) Field of Classification Search
CPC .............. E05F 15/44; E05Y 2400/654; E05Y 2900/531; B60J 10/12
USPC ........ 49/26, 27, 28, 506; 296/216.01, 220.01, 296/216.06, 216.07, 216.09
See application file for complete search history.

(56) References Cited

U.S. PATENT DOCUMENTS 5,079,417 A * 1/1992 Strand ............................ 250/221
5,087,799 A * 2/1992 Pariot et al. ................. 200/61.43
5,192,837 A * 3/1993 Chardon ..................... 200/61.41

(Continued)

FOREIGN PATENT DOCUMENTS

| EP | 390618 A1 * | 10/1990 | .............. E05F 15/00 |
|---|---|---|---|
| EP | 1 043 471 A1 | 10/2000 | |

(Continued)

OTHER PUBLICATIONS

European Search Report dated Sep. 4, 2014 issued by the European Patent Office in related European Patent Application No. 14167619.7 (7 pages).

*Primary Examiner* — Jerry Redman
(74) *Attorney, Agent, or Firm* — Robert P. Michal, Esq.; Carter, DeLuca, Farrell & Schmidt, LLP

(57) ABSTRACT

A protector with a sensor is installed on a sliding door for detecting an alien substance by touch between two core wires in a hollow part. In a terminal part of the protector with the sensor, the core wires drawn out are connected with leads joined with a control unit, an insert fills up a space and the terminal part is die molded. Materials of the insert and the die molding material have compatibility with each other.

3 Claims, 7 Drawing Sheets

(56) References Cited

U.S. PATENT DOCUMENTS

| | | | |
|---|---|---|---|
| 5,418,342 A * | 5/1995 | Miller | 200/61.43 |
| 5,438,798 A * | 8/1995 | Plamper et al. | 49/28 |
| 5,459,962 A * | 10/1995 | Bonne et al. | 49/28 |
| 5,728,984 A * | 3/1998 | Miller | 200/61.43 |
| 5,962,825 A * | 10/1999 | Miller | 200/61.43 |
| 6,107,580 A * | 8/2000 | Hoshikawa et al. | 200/61.43 |
| 6,339,305 B1 * | 1/2002 | Ishihara et al. | 318/445 |
| 6,463,698 B1 * | 10/2002 | Hofmann | 49/28 |
| 6,483,054 B2 * | 11/2002 | Suzuki et al. | 200/61.44 |
| 6,571,512 B1 * | 6/2003 | Miller et al. | 49/27 |
| 7,055,885 B2 * | 6/2006 | Ishihara et al. | 296/146.4 |
| 7,534,957 B2 * | 5/2009 | Yamaura et al. | 174/36 |
| 7,958,672 B2 * | 6/2011 | Ishihara | 49/26 |
| 8,901,940 B2 * | 12/2014 | Provenzano et al. | 324/649 |
| 2003/0000815 A1 * | 1/2003 | Burgess | 200/61.43 |
| 2003/0066741 A1 * | 4/2003 | Burgess et al. | 200/61.43 |
| 2007/0022819 A1 * | 2/2007 | Takeuchi et al. | 73/756 |
| 2008/0000166 A1 | 1/2008 | Whitehead | |
| 2012/0222296 A1 | 9/2012 | Miyamoto et al. | |

FOREIGN PATENT DOCUMENTS

| | | | | |
|---|---|---|---|---|
| JP | 2001-297842 A | 10/2001 | | |
| JP | 2005-114395 A | 4/2005 | | |
| JP | 2010-015696 A | 1/2010 | | |
| JP | 2010-137808 A | 6/2010 | | |
| WO | WO 9408119 A1 * | 4/1994 | | E05F 15/00 |

* cited by examiner

PROTECTOR WITH SENSOR AND METHOD OF MOLDING END PART OF THE SAME

CROSS REFERENCE TO RELATED APPLICATION

This application claims the benefit under 35 USC §119 of JP Patent Application JP 2013-106634 filed May 20, 2013, the entire disclosure of which is incorporated herein by reference.

BACKGROUND INFORMATION

The present invention relates to protectors with sensors and methods of molding end parts of the protectors with the sensors. When alien substances including fingers are caught between openings of automobiles and opening or closing objects for opening or closing the openings of automobiles, the sensors of the protectors output corresponding signals for detecting the alien substances. The opening or closing objects include: doors such as sliding doors on wagons, station wagons or the like sliding frontward and rearward of the automobile bodies and back doors; and sun roofs.

A protector 10, 20 with a sensor is installed on an automobile including a wagon shown in FIG. 4 of which a sliding door 1 (or a back door) opens or closes an opening of an automobile body or on an automobile shown in FIG. 5 of which sun roof 2 opens or closes the opening of the automobile body.

For example, the protector 10 with the sensor, extending in an upper and lower direction as shown in FIG. 6, is installed on a front end surface of the sliding door 1. The protector 10 with the sensor extends frontward of the automobile body from the front end surface of the sliding door 1.

As shown in FIG. 7 and FIG. 8, the protector 10 with the sensor, installed on the front end surface of the sliding door 1 comprises: an installation base member 11 having a substantially U-shaped cross section including an inner-cabin side wall 11a, an outer-cabin side wall 11b and a connecting wall 11c; and a hollow part 12 integrally molded with the installation base member 11. The hollow part 12 comprises a sensor (pressure sensitive sensor) 80 which outputs a corresponding electric signal upon detecting the alien substance such as a part of human bodies (fingers, hands or legs) between the sliding door 1 and a body side opening (may also be front door or side door) (see, for example, Japanese unexamined Patent Publications No. 2010-15696, No. 2001-297842 and No. 2005-114395).

In a lower part of the protector 10 with the sensor, a channel part 13 having a substantially C-shaped cross section is integrally molded with the inner-cabin side wall 11a side of the installation base member 11 for holding wire harness 90 joined with the pressure sensitive sensor 80. The installation base member 11 has a plurality of holding lips 14 formed inside and a core 15 having a substantially U-shaped cross section embedded therein for increasing rigidity. In addition, a decorative lip 16 is provided on the outer-cabin side wall 11b of the installation base member 11.

The sensor (pressure sensitive sensor) 80 has two core wires (electrode wires) 31, 32 extending in an upper and lower direction (longitudinal direction) embedded in conductive rubber-like elastic bodies 34, 35 with a space 33 therebetween, which are fixed in the hollow part 12. As the alien substance is caught between the sliding door 1 and the body side opening while closing the sliding door 1, a part of the hollow part 12 is pressed and crushed, and then the rubber-like elastic bodies 34, 35 contact with each other and the two core wires 31, 32 short. Resultant change in electric signal is transmitted to a control unit 40 joined with leads 36 which are connected with the two core wires 31, 32 in a lower side terminal part of the protector 10 with the sensor, and as a result, the alien substances are detected. The leads 36 covered with insulator are tied by the wire harness 90. Top ends of the leads 36, bared from covered parts 37, are naked wires.

As shown in FIGS. 9(a) to 9(c), in the lower side terminal part of the protector 10 with the sensor, the leads 36 are piled on the two core wires 31, 32 drawn out in a longitudinal direction (left direction in FIGS. 9(a) to 9(c) relative to a sheet), the leads 36 and the two core wires 31, 32 are connected by resistance welding or soft soldering (FIG. 9(b)) and an insert 25 fills up the space 33 which is exposed in an end part (FIG. 9(c)). Then, as shown in FIG. 10, a wire connection part 70, the insert 25 and a part of the wire harness 90 are embedded in a die molded part by die molding and are not exposed.

Also, as shown in FIG. 11, in an upper side terminal part of the protector 10 with the sensor, legs of a resistor 39 are piled on the two core wires 31, 32 drawn out in the longitudinal direction (right direction in FIG. 11 relative to the sheet), the legs and the two core wires 31, 32 are connected by resistance welding or soft soldering and an insert 26 fills up the space 33. Then, the wire connection parts 70, the insert 26 and the resistor 39 are embedded in a die molded part by the die molding and are not exposed.

In FIGS. 10 and 11, dotted lines show the die molded parts.

The inserts 25, 26 fill up the space 33 for preventing decline in sensor function caused by die molding material flowing in the space 33 during the die molding. The inserts 25, 26 prevent the two core wires 31, 32 including the wire connection parts 70 from contacting with each other in the die molded part and shorting. In addition, the inserts 25, 26 enable the wiring and the resistor 39 to be securely sealed inside the die molded part.

While examples of the material used for the inserts include PA6 materials and PET materials, ordinary die molded terminal parts have been made of materials of different kinds. The structure necessitates formation of dies for the inserts for forming the inserts in an extra process, which increases costs.

Japanese unexamined Patent Publication No. 2010-15696 discloses to insert end caps into the hollow parts for preventing resin from going into the hollow parts while die molding the terminal parts, but does not disclose material of the end caps.

Japanese unexamined Patent Publication No. 2001-297842 does not disclose to die mold the terminal parts.

Japanese unexamined Patent Publication No. 2005-114395 discloses a method of simply molding the terminal parts by processes which are easily automated, but the terminal parts are molded by a plurality of processes, not by a single die molding.

The wire connection parts 70 and the resistor 39 are easily affected by injection molding pressure while the wire connection parts 70 and the resistor 39 are being embedded in the die molded parts. In this connection, for preventing the wire connection part 70 or the resistor 39 from being exposed or for preventing the wires from being damaged, in the lower side terminal part of the protector 10 with the sensor, the wire connection part 70 and the leads 36 have to be firmly fixed on a surface of the insert 25 by adhesive for positioning, while in the upper side terminal part of the protector 10 with the sensor, the wire connection parts 70 and the resistor 39 have to be firmly fixed on a surface of the insert 26 by adhesive for positioning.

The structure necessitates an additional process of adhesion, and an increase in amount of adhesive to be used has caused insufficient adhesion. In addition, the use of adhesive tends to cause unevenness, which makes it difficult to stably fix the wire connection parts 70 and the resistor 39.

Therefore, an object of the present invention is to lower costs and simplify operability of die molding the terminal parts.

Another object of the present invention is to provide the protectors with the sensors capable of simply fixing the wire connection parts on the inserts which prevent the die molding materials from flowing in, not solely by the adhesive.

SUMMARY

In order to achieve the above-mentioned object, according to one aspect of the invention, a protector with a sensor is provided, the protector with the sensor comprising: an installation base member (11) operatively coupled on a peripheral edge of an opening or closing object for opening or closing an opening of an automobile body, the opening or closing object including a door (1) or a sun roof (2) of an automobile, or on a peripheral edge of said opening; and a hollow part (12) integrally molded with the installation base member (11), the hollow part (12) having two core wires (31, 32) and a space (33) provided therein, the space (33) being positioned between the two core wires (31, 32), in which:

when an alien substance caught between said opening or closing object and said opening presses and crushes said hollow part (12) while closing said opening or closing object, a corresponding change in electric signal detects said alien substance; and in a terminal part, said core wires (31, 32) drawn out in a longitudinal direction are connected with leads (36), said leads (36) being joined with a control unit (40) or an electrical component, and one end side of an insert (50) made of a non-conductive material is inserted in and fills up said space (33), and said terminal part is die molded, wherein:

materials of said insert (50) and die molding material have compatibility with each other.

It is to be noted that the "change in electric signal" includes a change by short between the two core wires and a change in capacitance.

In addition, according to an aspect of the present invention, both of the materials of said insert (50) and said die molding material are soft thermoplastic elastomer materials (TPE materials).

In addition, according to an aspect of the present invention, said insert (50) is made of a flexible material, has channels (55, 58, 65) formed thereon for storing wire connection parts (70) of said core wires (31, 32) and the leads (36) and encloses the wire connection parts (70).

In addition, according to an aspect of the present invention, said channels (55, 65) are concaves having openings covered with right and left overhangs (53, 54, 63, 64) overhanging from both sides toward inner sides.

In addition, according to an aspect of the invention, a method of molding an end part of a protector with a sensor is provided, the protector with the sensor comprising: an installation base member (11) operatively coupled on a peripheral edge of an opening or closing object for opening or closing an opening of an automobile body, the opening or closing object including a door (1) or a sun roof (2) of an automobile, or on a peripheral edge of said opening; and a hollow part (12) integrally molded with the installation base member (11), the hollow part (12) having two core wires (31, 32) and a space (33) provided therein, the space (33) being positioned between the two core wires (31, 32), in which:

when an alien substance caught between said opening or closing object and said opening presses and crushes said hollow part (12) while closing said opening or closing object, a corresponding change in electric signal detects said alien substance; and in a terminal part, said core wires (31, 32) drawn out in a longitudinal direction are connected with leads (36), said leads (36) being joined with a control unit (40) or an electrical component, and one end side of an insert (50) made of a non-conductive material is inserted in and fills up said space (33), and said terminal part is die molded, wherein:

materials of said insert (50) and said die molding material are the same and said insert (50) is simultaneously die molded while the end part of said protector (10) is being die molded.

Symbols in parentheses show constituents or items corresponding to the drawings.

According to the protector with the sensor of the present invention, the terminal part is die molded while the insert fills up the space from the opening of the hollow part and the materials of the insert and the die molding material have compatibility with each other. Accordingly, when the insert and the die molding material have homogeneity in such a manner as to mutually fuse, unification of the insert and the die molding material improves handling of the protector with the sensor and prevents entrance of water toward an internal electrical component or wiring without using adhesive or the like. In addition, even in case the insert has to be wrapped with an extra resin material (adhesive) for further preventing entrance of water, the compatibility between the insert and the die molding material simplifies selection of the adhesive having high adhesiveness with the insert and the die molding material.

In case the materials of the insert and the die molding material are the same, when a shape modelled on the insert is embedded in a part of a material flow passage inside the die for molding the terminal part, the insert can be simultaneously molded while the terminal part is being molded.

The structure does not necessitate an extra die for the insert for manufacturing the insert in an extra process as in the prior art, thereby reducing costs of manufacturing components and production. Also, the structure which enables the simultaneous molding of the insert as well as the terminal part in the single die molding is excellent in operability.

In addition, the insert is made of the flexible material, has the channels formed thereon for storing the wire connection parts and encloses the wire connection parts. The structure enables the die molding while keeping the wire connection parts on the appropriate positions without using adhesive as in the prior art.

The structure easily prevents exposure of the wire connection parts from the die molded part or damages to the wires, caused by the injection molding pressure during the die molding and does not degrade external appearance.

The structure without use of the adhesive does not necessitate the extra process and does not cause insufficient adherence.

In addition, the channels are concaves having the openings covered with the right and left overhangs overhanging from both sides toward the inner sides. Therefore, the wire connection parts stored in the channels are kept more stably and do not easily expose from the die molded part easily.

Especially, when the materials of the insert and the die molding material are soft thermoplastic elastomer materials (TPE materials), the insert can have further flexibility, the channels for surrounding the wire connection parts can be simply shaped on the insert and the structure of the die can be simplified. Examples of the thermoplastic elastomer include olefin TPO and styrene TPS.

DESCRIPTION OF PREFERRED EMBODIMENT

Referring to FIG. 1, FIG. 2, FIG. 4 to FIG. 11, a protector with a sensor according to an embodiment of the present invention will be described.

Figure 4:
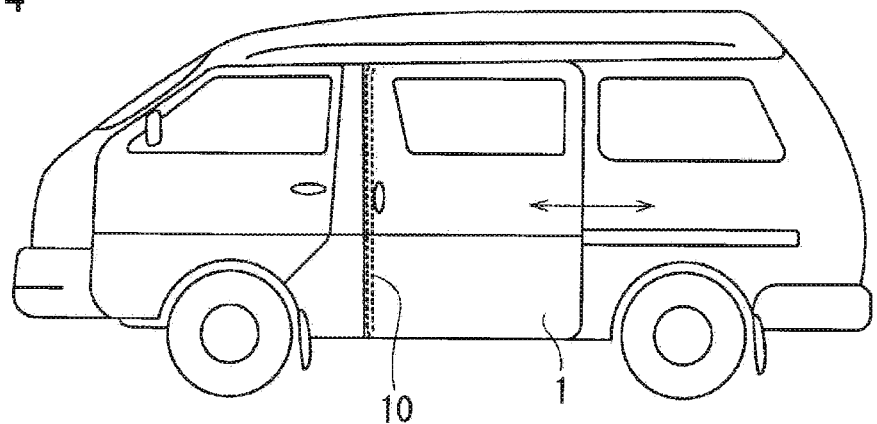
FIG. 4 is a side view of an automobile which opens or closes by a sliding door.

A protector 10 with a sensor of the embodiment of the present invention, which extends toward a front side of an automobile body is installed on a front end surface of a sliding door 1 of an automobile shown in FIG. 4 of which the sliding door 1 opens or closes an opening of the automobile body. A sensor (pressure sensitive sensor) 80 installed on the protector 10 with the sensor outputs electric signal upon detecting an alien substance such as a part of human body (finger, hand or leg) between the sliding door 1 and a body side opening (may also be front door or side door). Both the present invention and the prior art comprise the structures of FIG. 6 to FIG. 8. But an insert 50 of the present invention is different from an insert 25 of the prior art in structure and material. Also, the present invention is different from the prior art in the following aspects: core wires (electrode wires) 31, 32 are connected with leads 36 which are further connected with leads joined with a control unit 40 or an electrical component for detecting the alien substance based on change in electric signal in the core wires 31, 32; and structure for fixing circumference of a wire connection parts 70 of the core wires 31, 32 and the leads 36. When constituents or items correspond to those in prior arts, the same symbols are used.

The protector 10 with the sensor comprises: an installation base member 11 operatively coupled on a flange (not shown) formed on a sliding door 1 directly; a hollow part 12 which is integrally molded with the installation base member 11 and which makes elastic contact with the alien substance when the alien substance including a finger is caught between a front end surface of the sliding door 1 and a body side opening which faces the front end surface while closing the door 1; and the sensor (pressure sensitive sensor) 80 which is incorporated in the hollow part 12 and which outputs a corresponding electric signal upon detecting the alien substance. The sensor (pressure sensitive sensor) 80 has two core wires (electrode wires) 31, 32 extending in an upper and lower direction (longitudinal direction) embedded in conductive rubber-like elastic bodies 34, 35 with a space 33 therebetween, which are fixed in the hollow part 12.

Figure 1:
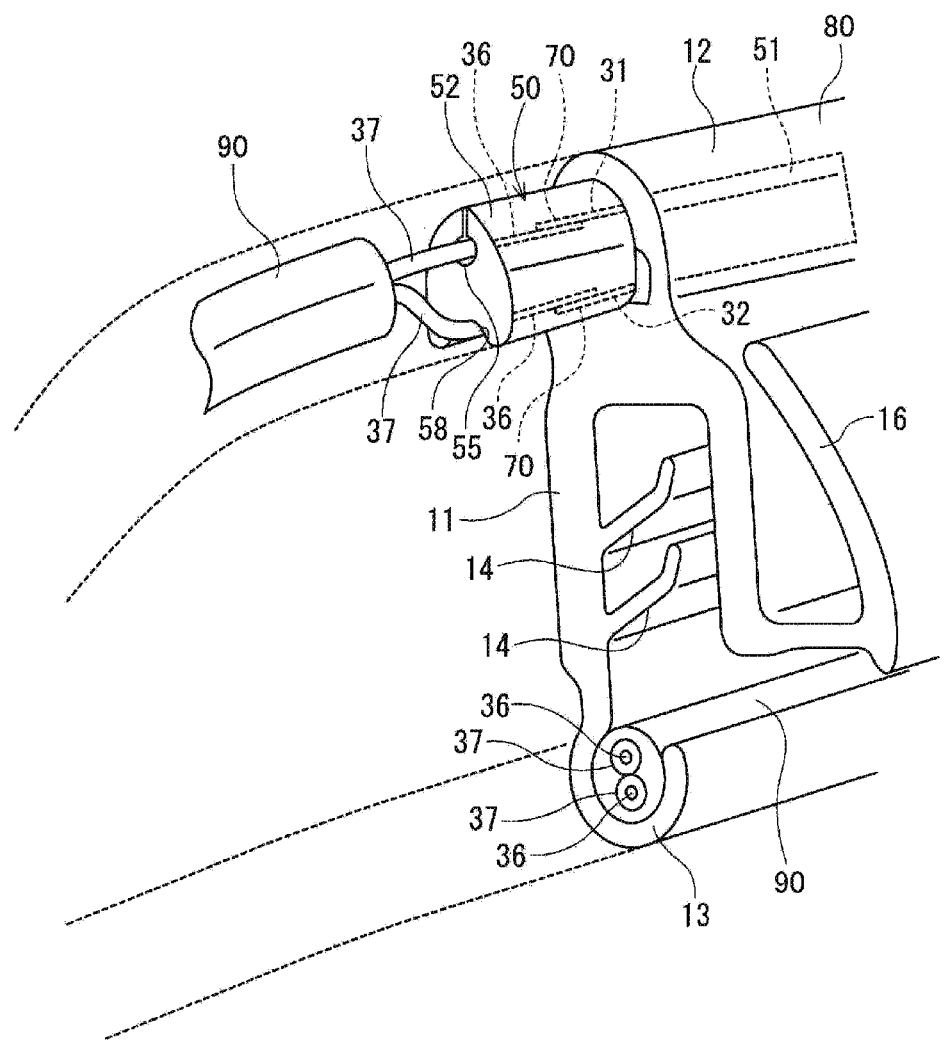
FIG. 1 is a perspective view of a lower side terminal part of a protector with a sensor according to an embodiment of the present invention at a time of die molding.
Figure 2:
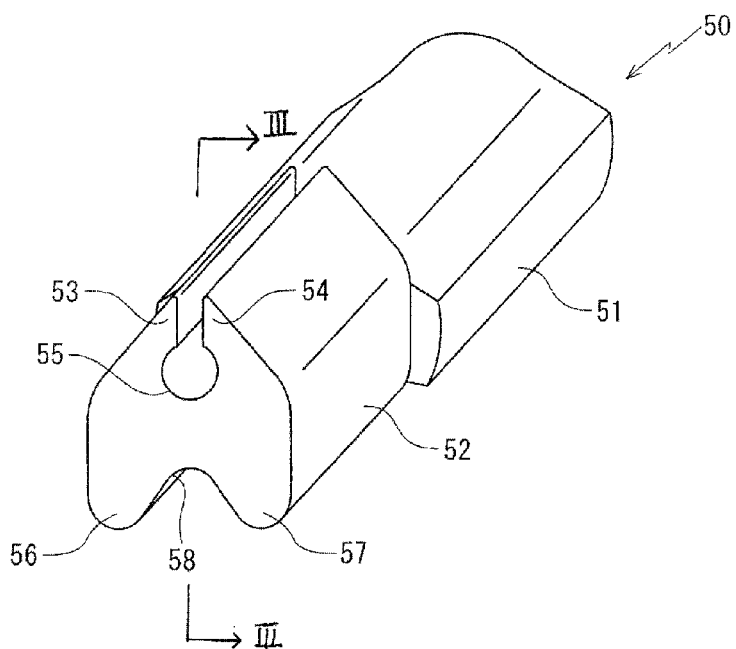
FIG. 2 is a perspective view of an insert of the protector with the sensor according to the embodiment of the present invention.

As shown in FIG. 1, in a lower side terminal part of the protector 10 with the sensor, the insert 50 having a shape shown in FIG. 2 fills up the space 33 of the hollow part 12, which is open in the lower side terminal part.

The insert 50 is made of a flexible and non-conductive material and comprises an insertion part 51 on one end side and a protrusion part 52 having a substantially heart-shaped cross section on another end side. In the present embodiment, length of the insertion part 51 and the protrusion part 52 in a longitudinal direction is substantially the same but the length is not specifically limited.

Figure 9:
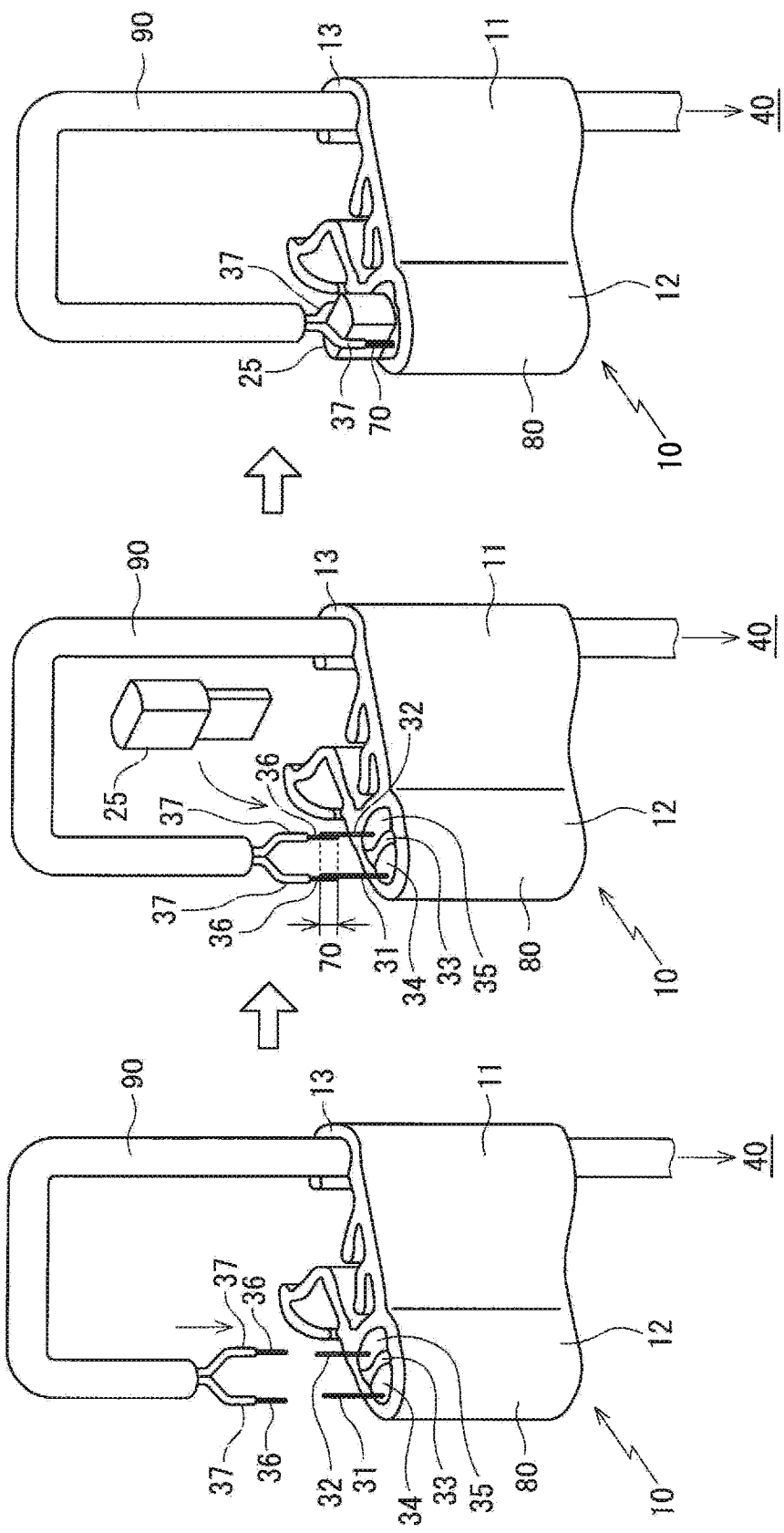
FIG. 9 (a), FIG. 9 (b) and FIG. 9 (c) are perspective views of processes before die molding a lower side terminal part of a protector with a sensor according to a prior art.
Figure 10:
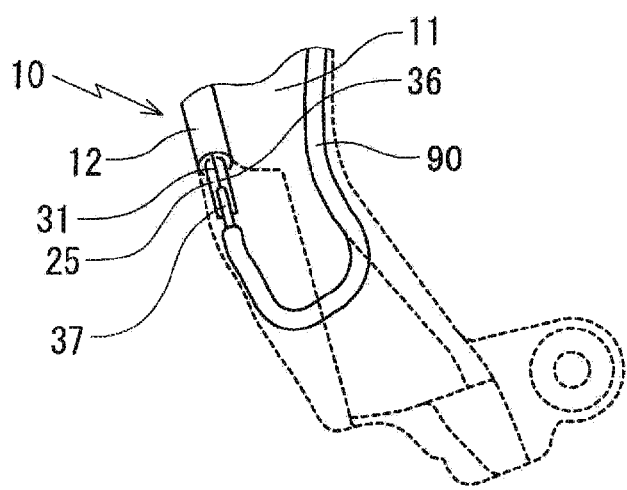
FIG. 10 is a perspective view of a structural gist of the lower side terminal part of the protector with the sensor according to the prior art after die molding.

The insertion part 51 has a cross sectional shape which is substantially the same as or a little larger than the space 33 for being pressed in the space 33 of the hollow part 12 and tightly filling up the space 33, thereby preventing decline in sensor function caused by die molding material flowing in the space 33 during die molding. In the present embodiment, the insertion part 51 has a substantially ridge shaped cross section. Since a cross section of a space 33 of FIG. 9 is a little different from the present embodiment, an insertion part 51 having a cross sectional shape corresponding to the space 33 of FIG. 9 is used. In other words, the cross sectional shape of the insertion part 51 corresponds to the cross sectional shape of the space 33 for tightly filling up the space 33.

As shown in FIG. 2, the protrusion part 52 has two channels 55, 58 of different shapes formed thereon for storing the wire connection parts 70 and encloses the stored wire connection parts 70 by peripheral edges forming the channels 55, 58. The channel 55 is a concave having an opening covered with right and left overhangs 53, 54 overhanging from both sides toward inner sides. The channel 55 has a cross sectional shape of a keyhole.

The channel 55 stores: the wire connection part 70 formed by piling a naked wire of a top end of the lead 36 joined with the control unit 40 on the core wire 31 drawn out from the hollow part 12 toward a lower side in a longitudinal direction, and connecting the lead 36 and the core wire 31 by resistance welding or soft soldering; and a top end of a covered part 37 of the lead 36. The channel 58 stores: the wire connection part 70 formed by piling the naked wire of the top end of a lead 36 joined with the control unit 40 on the other core wire 32 drawn out from the hollow part 12 toward the lower side in the longitudinal direction, and connecting the lead 36 and the core wire 32 by the resistance welding or the soft soldering; and the top end of the covered part 37 of the lead 36.

An interval between the right and left overhangs 53, 54 of the channel 55 is shorter than a diameter of the covered part 37 of the lead 36 so that the wire connection part 70 and the covered part 37 once stored in the channel 55 do not easily come off from appropriate positions. Surrounding walls 56, 57 of the channel 58 widen toward outer sides so that positioning of the wire connection part 70 and the covered part 37 in the channel 58 is easy.

A cross sectional shape of the channel 55, which is substantially the same as or a little smaller than the diameter of the covered part 37 enables to firmly keep the covered part 37 in the channel 55.

In the present embodiment, the materials of the insert 50 and the die molding material are soft TPO materials for keeping compatibility of the insert 50 and the die molding material well.

By die molding the lower end part of the protector 10, the insert 50, the wire connection part 70, the covered part 37 and a part of the wire harness 90 are embedded in a die molded part and are not exposed.

As both of the materials of the insert 50, which fills up the space 33 from an opening of the hollow part 12, and the die molding material are the same soft TPO materials, when a shape modelled on the insert 50 is embedded in a part of the die for molding the terminal part of the protector 10 with the sensor, the insert 50 can be simultaneously molded while the terminal part is being molded.

The structure does not necessitate a die exclusively for the insert 50 for manufacturing the insert 50 in an extra process as in the prior art, thereby reducing costs of manufacturing components and production. Also, the structure which enables the simultaneous molding of the insert as well as the terminal part in the single die molding is excellent in operability.

The insert 50 has the channels 55, 58 formed thereon for storing the wire connection parts 70 of the core wires 31, 32 and the leads 36, and encloses the wire connection parts 70. The structure enables the die molding while keeping the wire connection parts 70 on appropriate positions without using adhesive as in the prior arts.

The structure easily prevents exposure of the wire connection parts 70 from the die molded part or damages to the wires, caused by the injection molding pressure during the die molding, and does not degrade external appearance.

The structure without use of the adhesive does not necessitate an extra process and does not cause insufficient adherence.

In addition, one of the channels 55 is the concave having the opening covered with the right and left overhangs 53, 54 overhanging from both sides toward inner sides. Therefore, the wire connection part 70 stored in the channel 55 is kept more stably and does not easily expose from the die molded part.

Especially, when the materials of the insert 50 and the die molding material are soft TPO materials, the insert 50 can have further flexibility and can be easily taken off from the die after molding, the channels 55, 58 for surrounding the wire connection parts 70 can be simply shaped on the insert 50 and structure of the die can be simplified. The structure forms sense of unification between the insert 50 and the die molding material and simplifies handling of the protector 10 with the sensor.

In the present embodiment, the insert 50 and the die molding material are made of soft TPO materials. But any materials having compatibility with each other, and preferably having homogeneity in such a manner as to mutually fuse during the die molding, are usable as the insert 50 and the die molding material.

The insert 50 and the die molding material may have homogeneity in such a manner as to mutually fuse. The structure further achieves the sense of unification between the insert 50 and the die molding material and further simplifies handling of the protector 10 with the sensor. In addition, since the insert 50 adheres to the die molding material during the die molding without adhesive, entrance of water toward the internal electrical component or the wiring is prevented. It is to be noted that to "have homogeneity in such a manner as to mutually fuse" during the die molding means to assure that the insert 50 and the die molding material are homogeneous in such a manner as to mutually fuse during the die molding: in case the die molding material is made of TPO, the insert 50 may be TPE containing polypropylene, polyethylene, TPO or olefin resin. Examples of the TPE containing olefin resin include styrene thermoplastic elastomer (TPS). In case the die molding material is made of TPS, by adding olefin resin to the TPS, the above-mentioned examples of the material of the insert 50 can have homogeneity to fuse with the die molding material in a similar manner as a case the die molding material is made of TPO.

Materials of the insert 50 and the die molding material may have the same degree of rigidity. Said structure further achieves the sense of unification of the insert 50 and the die molding material and further simplifies handling of the protector 10 with the sensor. The rigidity (hardness) is preferably in a range of 20 to 90 JISA of Japanese Industrial Standards (JIS), and more preferably, 40 to 90 JISA. When the rigidity is less than 40 JISA, the die molded part may insufficiently function (such as assembling property on the automobile body) and when the rigidity is less than 20 JISA, the die molded part does not sufficiently function. In case the insert 50 is wrapped with an extra resin material (adhesive, for example) for preventing the entrance of water toward the internal electrical component or wiring, the extra resin material which is as soft as or softer (lower rigidity) than the die molding material does not hamper the above-mentioned sense of unification.

In the present embodiment, as shown in FIG. 2, the protrusion part 52 having a substantially heart-shaped cross section has the channels 55, 58 formed thereon for storing the wire connection parts 70 and the covered parts 37. But the shape of the insert 50 is not especially limited and the insert 50 of any shape provided with surrounding walls for enclosing the wire connection parts 70 and the covered parts 37 as well as the channels for storing the wire connection parts 70 and the covered parts 37 is usable.

Figure 3A:
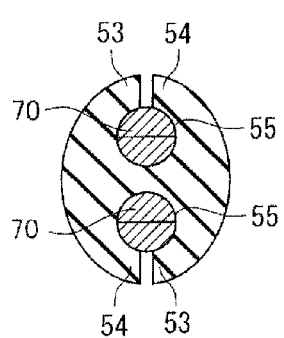
FIG. 3 (a) and FIG. 3 (b) are cross sections of another insert of the protector with the sensor according to the embodiment of the present invention.
Figure 3B:
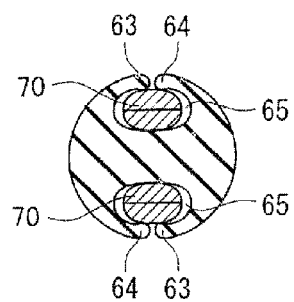

Examples of variation of the insert 50 include FIG. 3 (*a*) in which the insert 50 has two channels 55 formed thereon, that is, the channel 58 is changed into the channel 55 which is the concave having the opening covered with the right and left overhangs 53, 54.

Examples of the variation of the insert 50 also include FIG. 3 (*b*) in which the insert 50 has two concaves 65 having substantially C-shaped cross sections of which openings are covered with right and left lips 63, 64 curving from both sides toward inner sides. One of or both of the wire connection parts 70 and the covered parts 37 are pressed into the concaves 65 respectively so that top ends of the lips 63, 64 elastically engage the wire connection parts 70 or the covered parts 37, thereby holding down the wire connection parts 70 or the covered parts 37 inside the concaves 65.

Figure 11:
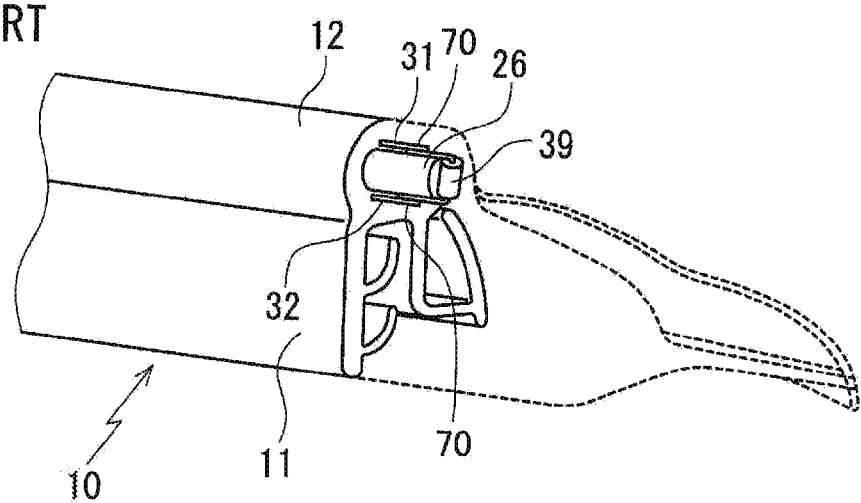
FIG. 11 is a perspective view of a structural gist of an upper side terminal part of the protector with the sensor according to the prior art after die molding.

The present embodiment specifies the method of molding the lower side terminal part of the protector 10 with the sensor. But the present invention is also applicable to an upper side terminal part of the protector 10 with the sensor of FIG. 11, provided with a resistor 39 as an electrical component. More specifically, as the materials of the insert filling up the space 33 of the hollow part 12 in the upper side terminal part of the protector 10 with the sensor and the die molding material are homogeneous, when a shape modelled on the insert is embedded in a part of a material flow passage inside the die for molding the terminal part, the insert can be simultaneously molded while the terminal part is being molded.

The present embodiment specifies an example that the protector 10 with the sensor is installed on the sliding door 1 side of the automobile, which slides frontward and rearward. But the protector 10 with the sensor may be installed on the body side opening for detecting the alien substance between the sliding door and the body side opening.

Figure 5:
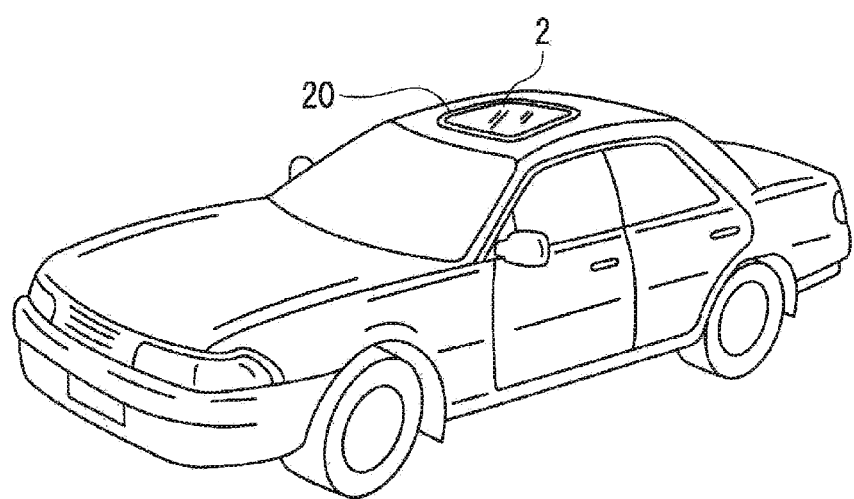
FIG. 5 is a perspective view of an automobile with a sun roof.
Figure 6:
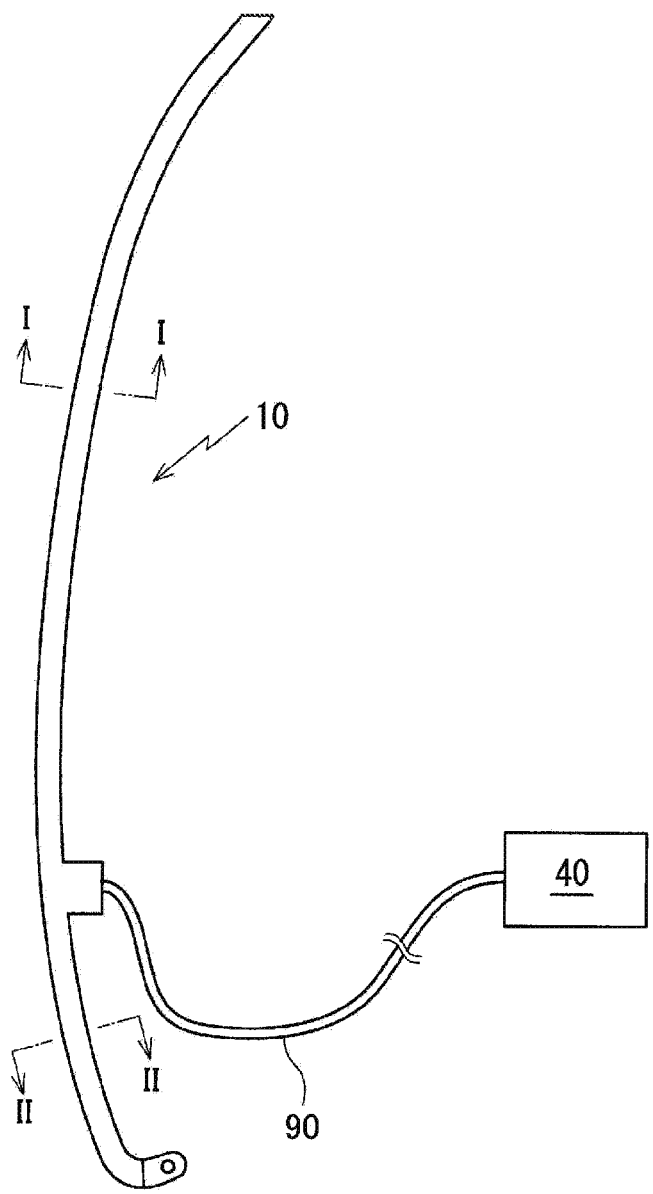
FIG. 6 is a side view of the protector with the sensor of FIG. 4.
Figure 7:
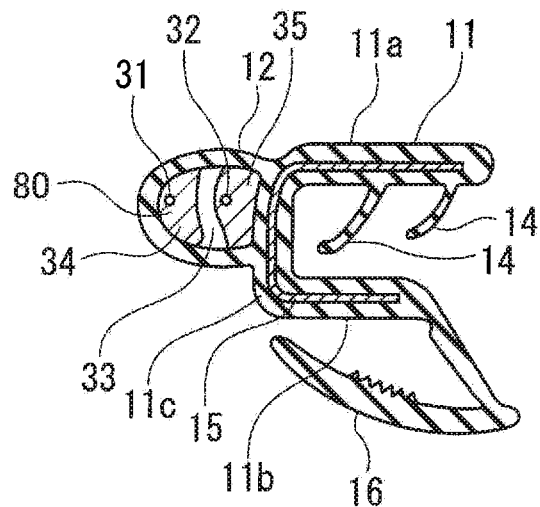
FIG. 7 is a I-I line enlarged cross section of FIG. 6.
Figure 8:
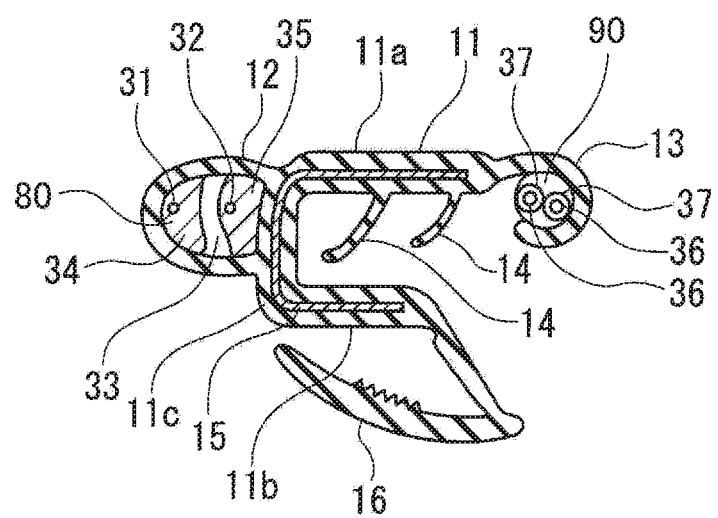
FIG. 8 is a II-II line enlarged cross section of FIG. 6.

Also, the protector 10 with the sensor is applicable to a back door or a sun roof 2 (FIG. 5).

We claim:

1. A protector with a sensor comprising: an installation base member operatively coupled on a peripheral edge of a panel which moves between at least two positions to open and close an opening of an automobile body or on a peripheral edge of said opening, the panel including a door or a sun roof of an automobile; and a hollow part integrally molded with the installation base member, the hollow part having two core wires and a space provided therein, the space being positioned between the two core wires, in which:

when an object is disposed between said panel and said opening and makes contact with said hollow part when said panel is moved towards a closed position, a corresponding change in electric signal detects said object; and in a terminal part, said core wires drawn out in a longitudinal direction are connected with leads, said leads being joined with a control unit or an electrical component, and one end side of an insert made of a non-conductive material is inserted in and fills up said space, and said terminal part is die molded, wherein:

materials of said insert and said die molding material have compatibility with each other, said insert is made of a flexible material, has channels formed thereon for storing wire connection parts of said core wires and the leads and encloses the wire connection parts, and said channels are concave shaped openings covered with right and left overhangs overhanging from both sides toward inner sides.

2. The protector with the sensor as claimed in claim 1, wherein: said insert and said die molding material comprise soft TPE materials.

3. A method of molding an end part of a protector with a sensor comprising: an installation base member operatively coupled on a peripheral edge of a panel which moves between at least two positions to open and close an opening of an automobile body or on a peripheral edge of said opening, the panel including a door or a sun roof of an automobile; and a hollow part integrally molded with the installation base member, the hollow part having two core wires and a space provided therein, the space being positioned between the two core wires, in which:

when an object is disposed between said panel and said opening and makes contact with said hollow part when said panel is moved towards a closed position, a corresponding change in electric signal detects said object; and in a terminal part, said core wires drawn out in a longitudinal direction are connected with leads, said leads being joined with a control unit or an electrical component, and one end side of an insert made of a non-conductive material is inserted in and fills up said space, and said terminal part is die molded, wherein:

materials of said insert and said die molding material are the same and said insert is simultaneously die molded while the end part of said protector is being die molded, said insert is made of a flexible material, has channels formed thereon for storing wire connection parts of said core wires and the leads and encloses the wire connection parts, and said channels are concave shaped openings covered with right and left overhangs overhanging from both sides toward inner sides.

* * * * *